(12) United States Patent
Yanagawa

(10) Patent No.: US 6,246,660 B1
(45) Date of Patent: Jun. 12, 2001

(54) DEVICE FOR CONTROLLING THE POWER OF A RECORDING OPTICAL BEAM IN AN INFORMATION STORAGE APPARATUS

(75) Inventor: Naoharu Yanagawa, Tokorozawa (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/275,412

(22) Filed: Mar. 24, 1999

(30) Foreign Application Priority Data

Mar. 24, 1998 (JP) .................................................. 10-095415

(51) Int. Cl.[7] ....................................................... G11B 7/00
(52) U.S. Cl. ........................ 369/116; 369/47.5; 369/53.26
(58) Field of Search .................................. 369/47.1, 47.5, 369/47.51, 47.52, 47.53, 53.1, 53.26, 53.27, 116

(56) References Cited

U.S. PATENT DOCUMENTS 5,699,342 * 12/1997 Yagi et al. ........................ 369/116 X
6,115,338 * 9/2000 Masaki et al. .................... 369/116 X

FOREIGN PATENT DOCUMENTS 0 800 165 A1   10/1997 (EP) .
9-326138       12/1997 (JP) .

* cited by examiner

Primary Examiner—Muhammad Edun
(74) Attorney, Agent, or Firm—Morgan, Lewis & Bockius LLP

(57) ABSTRACT

A recording power control device is capable of optimizing the recording power of a recording optical beam at every recording position on a DVD-R (recordable) disk while an optical disk drive is recording information on the DVD-R disk with the recording optical beam. Simultaneously with the recording optical beam, the disk drive emits an adjusting optical beam behind the recording optical beam in the direction in which information is recorded. The disk drive has a first photodetector for receiving the reflected recording optical beam and a second photodetector for receiving the reflected adjusting optical beam. The recording power control device is equipped with a laser drive circuit for setting the recording power of the recording optical beam according to an output signal from the second photodetector, which receives the reflected adjusting optical beam.

15 Claims, 7 Drawing Sheets

DEVICE FOR CONTROLLING THE POWER OF A RECORDING OPTICAL BEAM IN AN INFORMATION STORAGE APPARATUS

This application claims the benefit of Japanese Patent Application No. 10-95415 filed on Mar. 24, 1998, which is hereby incorporated by reference.

BACKGROUND OF THE INVENTION

1. Field of the Invention

The present invention relates to a device for controlling the recording power of an optical beam used to record information onto an optical recording medium and more particularly to a device for controlling the recording power in digital video disc (DVD) drives.

2. Description of the Related Art

Various optical recording media are known. One example is a write once read many (WORM) optical disk to which information can be written once using an organic dye material. Another example is a rewritable optical disk that can be rewritten repeatedly using a phase-changing material or a magneto-optical material. With these optical recording media, information is recorded by making use of the fact that a physical property of the recording surface is varied by thermal energy of an optical beam impinging on the recording surface.

In the case of these optical recording media, the recording power may not be optimal, depending on the recording medium, even if the same recording material is used in every commercial product, and if uniform optical beam power is established for the same material, because the characteristics of the material are different among the individual commercial products.

In this kind of information storage system for recording information on such an optical recording medium, optimum power control (OPC) is provided before information is started to be recorded. That is, the recording power of the optical beam is optimized for the optical recording medium.

The optimum power control (OPC) is provided in the manner described below. Usually, before recording is started, trial writing is done into a region formed in a given position of the recording medium, called a PCA (power calibration area), while varying the power value within a given range. The tentatively written testing information is reproduced. The power value producing a reproduced signal having the least jitter is established as the recording power best suited for the recording medium. In this way, the power can be optimized under these conditions.

Generally, the recording conditions vary slightly depending on the recording position even if the same optical recording medium is used. For example, fingerprints might be scattered on the recording surface of the optical recording medium or the medium may be warped, varying the shape. This makes the recording conditions at each recording position different from the recording conditions in the power calibration area (PCA) described above. Accordingly, if recording is made over the whole surface of the recording medium with the given optimum power found in the PCA, the recording power might be excessive or insufficient depending on the recording position.

SUMMARY OF THE INVENTION

The present invention has been made in view of the above circumstances and has as an object the controlling or optimizing of a recording power of a recording optical beam by a control device at every recording position on an optical disk. This control is herein referred to as running OPC (optimum power control).

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a recording power control device for use with an optical disk drive for recording information on an optical recording medium in a recording direction with a recording optical beam having a recording power. The optical disk drive emits an adjusting optical beam simultaneously with the recording optical beam behind the recording optical beam. The optical disk drive has a light-receiving component for receiving the adjusting optical beam reflected from the optical recording medium. The recording power control device acts to control the recording power of the recording optical beam. The recording power control device includes a recording power control component for controlling the recording power of the recording optical beam preceding the adjusting optical beam in the recording direction according to an output signal from said light-receiving component.

It is to be understood that both the foregoing general description and the following detailed description are exemplary and explanatory only are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles on of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

In accordance with the invention, the present invention includes a recording power control device for use with an optical disk drive for recording information on an optical recording medium in a recording direction with a recording optical beam having a recording power. The optical disk drive emits an adjusting optical beam simultaneously with the recording optical beam behind the recording optical beam. The optical disk drive has a light-receiving means for receiving the adjusting optical beam reflected from the optical recording medium. The recording power control device controls the recording power of the recording optical beam. The recording power control device includes a recording power control means for controlling the recording power of the recording optical beam preceding the adjusting optical beam in the recording direction according to an output signal from the light-receiving means.

As embodied herein, an optical disk drive includes a pickup, an operational amplifier equipped with first through fourth arithmetic means, a decoder, a prepit signal decoder, a spindle motor, a servo circuit, an encoder, a processor that is a recording power control means, a power control circuit, a laser drive circuit, and an interface. The processor generates various instructions to an external host computer, which enters information to be recorded into the disk drive via the interface. Among the components described above, the pickup, the operational amplifier, the power control circuit, the laser drive circuit, and the processor constitute the recording power control device for controlling the recording power of the optical beam.

Preferably, the pickup consists of a laser diode, a collimator lens, a diffraction grating, a polarized beam splitter, a quarter-wavelength plate, an objective lens, a focusing lens, and a photodetector.

The invention will be further clarified by the following examples, which are intended to be purely exemplary of the invention.

Figure 1:
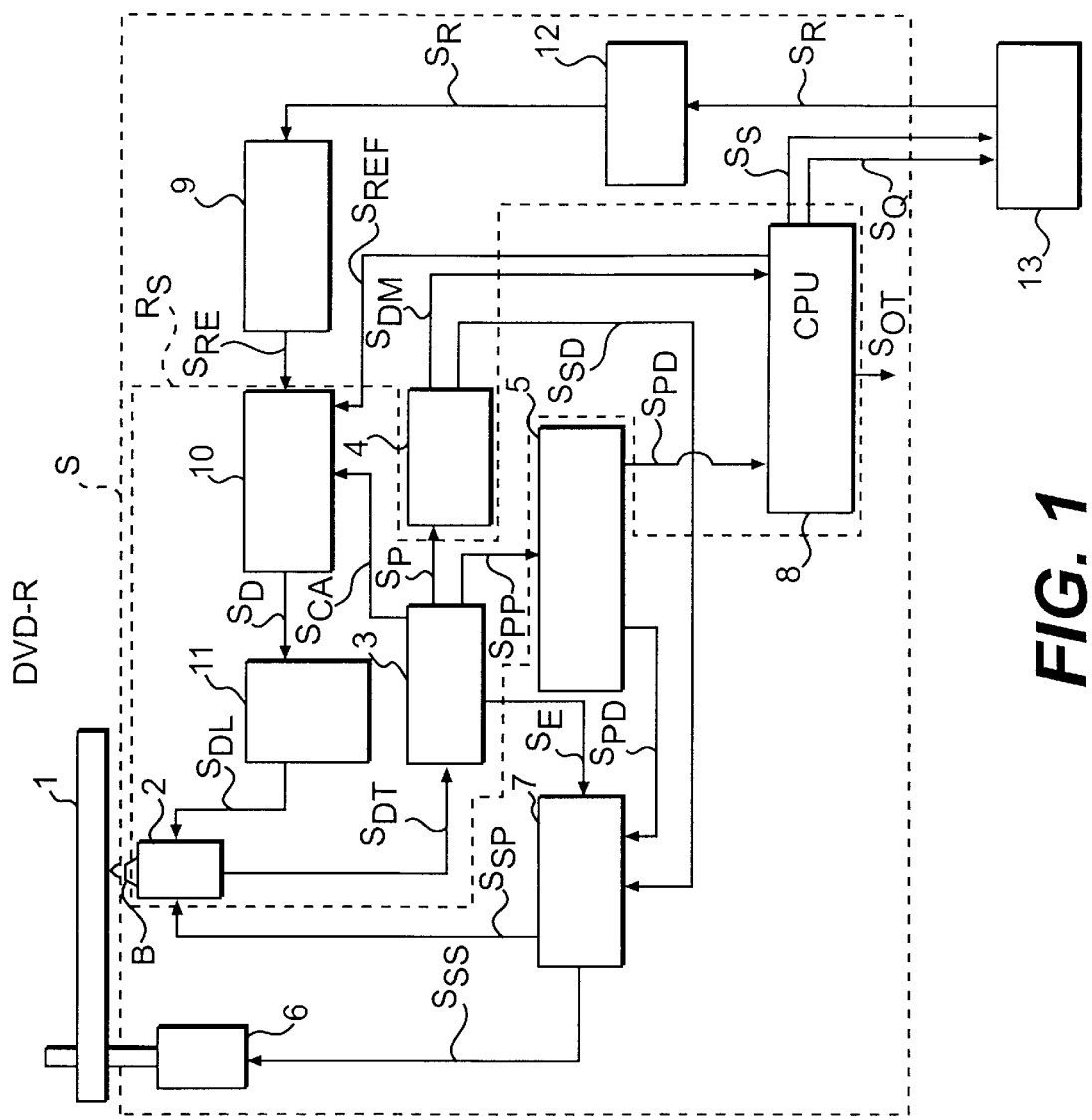
FIG. 1 is a block diagram of an optical disk drive equipped with a recording power control device in accordance with the present invention.

With reference to FIG. 1, an optical disk drive is equipped with a control device, RS, for controlling the recording power of an optical beam. The control device RS is built in accordance with an embodiment of the present invention. In this embodiment, the optical disk drive, indicated by S, records information on a DVD-R (recordable) disk 1 that is a write once read many (WORM) optical disk.

Prepits containing information about addresses and other information have been previously formed in the DVD-R disk 1. When information is recorded, the optical disk drive S detects the prepits to obtain information about addresses on the DVD-R disk 1. Thus, the drive S detects write positions where information is recorded on the disk 1, and makes a recording.

The optical disk drive S comprises a pickup 2, an operational amplifier 3 equipped with first through fourth arithmetic means, a decoder 4, a prepit signal decoder 5, a spindle motor 6, a servo circuit 7, an encoder 9, a processor 8 that is a recording power control means, a power control circuit 10, a laser drive circuit 11, and an interface 12. The processor 8 generates various instructions including Data Transfer command $S_Q$ and Data Transfer Stop command $S_S$. In response to these instructions, an external host computer 13 enters information $S_R$ to be recorded into the disk drive S via the interface 12.

Among the components described above, the pickup 2, the operational amplifier (OP) 3, the power control circuit 10, the laser drive circuit 11, and the processor 8 constitute the recording power control device RS for controlling the recording power of the optical beam.

Figure 2:
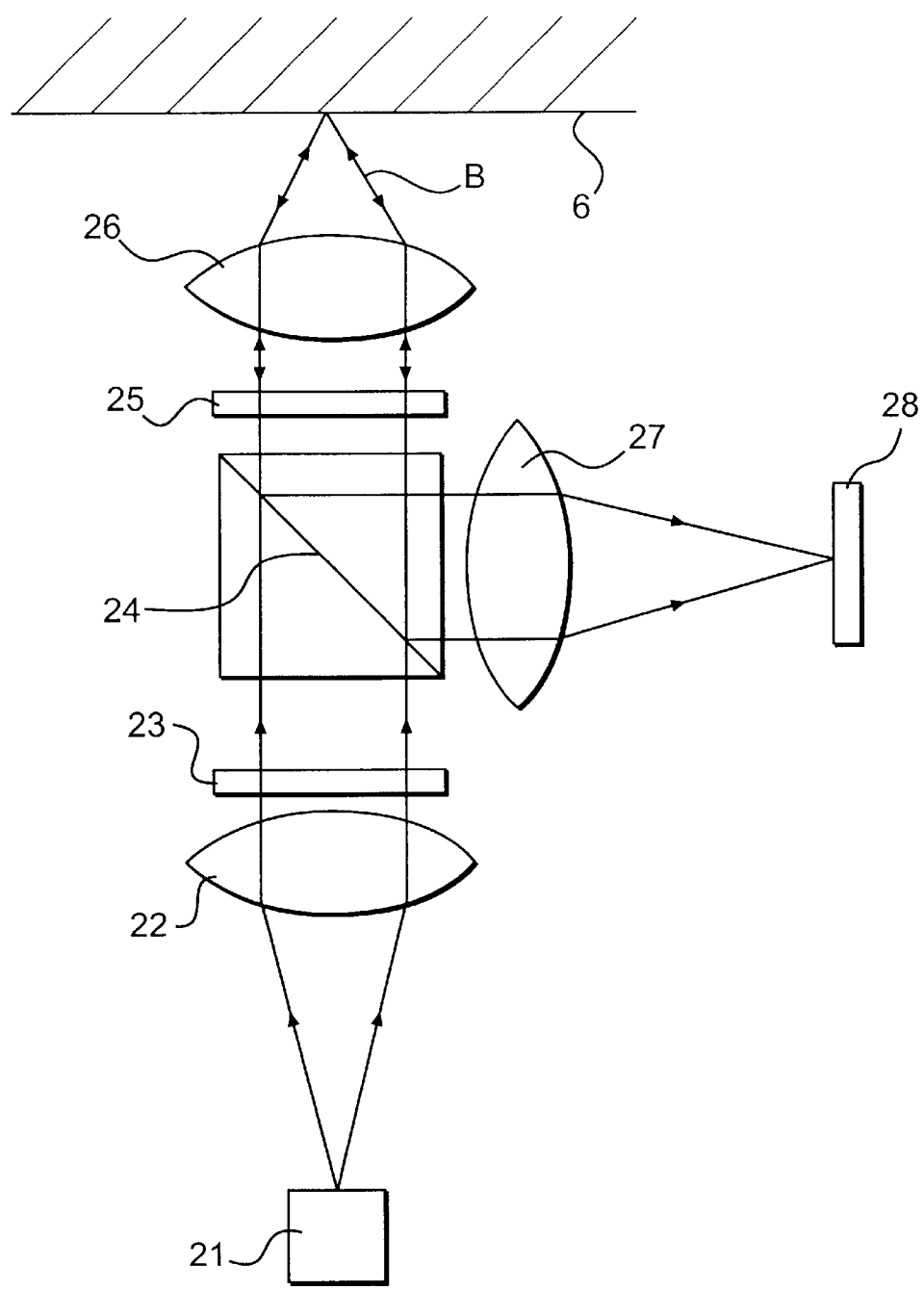
FIG. 2 is a diagram illustrating a specific example of a pickup 2 shown in FIG. 1.

With reference to FIG. 2, the pickup 2 consists of a laser diode 21, a collimator lens 22, a diffraction grating 23, a polarized beam splitter 24, a quarter-wavelength plate (QWP) 25, an objective lens 26, a focusing lens 27, and a photodetector 28. In response to a laser drive signal $S_{DL}$, the pickup 2 emits an optical beam B onto the recording surface of the DVD-R disk 1. Based on the reflected light, the pickup detects the prepits, which are then encoded by the encoder 9 (described later). The resulting encoded signal $S_{RE}$ is recorded by the pickup. If the DVD-R disk 1 has prerecorded information, it is detected using the reflected optical beam. The resulting output signal, $S_{DT}$, is sent to the operational amplifier 3.

The operational amplifier 3 arithmetically processes the output signal $S_{DT}$ from the photodetector 28 of the pickup 2 in the manner described later to produce a recording power-adjusting signal $S_{CA}$, a prepit detection signal $S_{pp}$, error signals $S_E$ regarding the focus of the optical beam B and the tracking control, and an amplified signal $S_p$ (RF signal) corresponding to the prerecorded information to the power control circuit 10, the decoder 4, the prepit signal decoder 5, and the servo circuit 7 that are processing circuits responding to the signals produced as described above.

The error signals $S_E$ consist of a focus error signal (FE signal) and a tracking error signal (TE signal) that are produced separately. The operational amplifier 3 creates the focus error signal (FE signal) and the tracking error signal (TE signal) separately, and send these error signals $S_E$ to the servo circuit 7.

The decoder 4 performs eight-to-sixteen demodulation and de-interleaving on the RF (radio-frequency) signal $S_p$ supplied from the operational amplifier 3. The RF signal $S_p$ contains information represented by a string of pits formed in the DVD-R disk 1. Thus, the decoder 4 decodes the RF signal $S_p$ and produces a demodulated signal $S_{DM}$ and a servo demodulation signal $S_{SD}$.

The prepit signal decoder 5 decodes the prepit detection signal $S_{pp}$ and produces a demodulated prepit signal $S_{PD}$. The servo circuit 7 produces a pickup servo signal $S_{SP}$ for focus servo control and tracking servo control in the pickup 2 from the error signals $S_E$. The servo circuit 7 also produces a spindle servo signal $S_{SS}$ from the demodulated prepit signal $S_{PD}$ and servo demodulation signal $S_{SD}$ to provide servo control of the spindle motor 6 that rotates the DVD-R disk 1.

Concurrently, the processor 8 produces reference data $S_{REF}$ to the power control circuit 10, the data $S_{REF}$ being used during operation for control of the recording power as described later. The processor 8 produces a reproduced signal $S_{OT}$ corresponding to the prerecorded information to the according to the demodulated signal $S_{DM}$. In this way, the processor 8 principally controls the operations for recording and reading information.

The interface 12 performs interface operations under the control of the processor 8 to accept the recorded information $S_R$ sent from the host computer 13 into the optical disk drive S. The interface 12 sends the recorded information $S_R$ to the encoder 9.

The encoder 9 includes an ECC (error correction code) generator, an eight-to-sixteen modulation portion, and a scrambler (none of which are shown). The encoder adds information error correction codes (ECCs) to the recorded information $S_R$ to form ECC blocks. The encoder 9 performs interleaving, eight-to-sixteen modulation, and scrambling on the ECC blocks to create the encoded signal $S_{RE}$ to be recorded on the DVD-R disk 1 actually.

The power control circuit 10 produces a drive signal $S_D$ to cause the pickup 2 to emit the optical beam with appropriate illumination power according to the encoded signal $S_{RE}$ and the aforementioned power-adjusting signal $S_{CA}$. This will be described in greater detail below.

Then, the laser drive circuit 11 amplifies the current of the drive signal $S_D$ to drive the laser diode described above and delivers the laser drive signal $S_{DL}$.

The optical disk drive S described above is able to reproduce the information recorded on the DVD-R disk 1. At this time, a reproduced signal $S_{OT}$ is produced to the outside via the processor 8 according to the demodulated signal $S_{DM}$.

The control device RS for controlling the recording power of the optical beam in accordance with the present invention is described in detail by referring to the drawings. The differential push-pull (DPP) method, which is a tracking error detection method and which is adopted by the present embodiment, is described with reference to FIG. 3.

Figure 3:
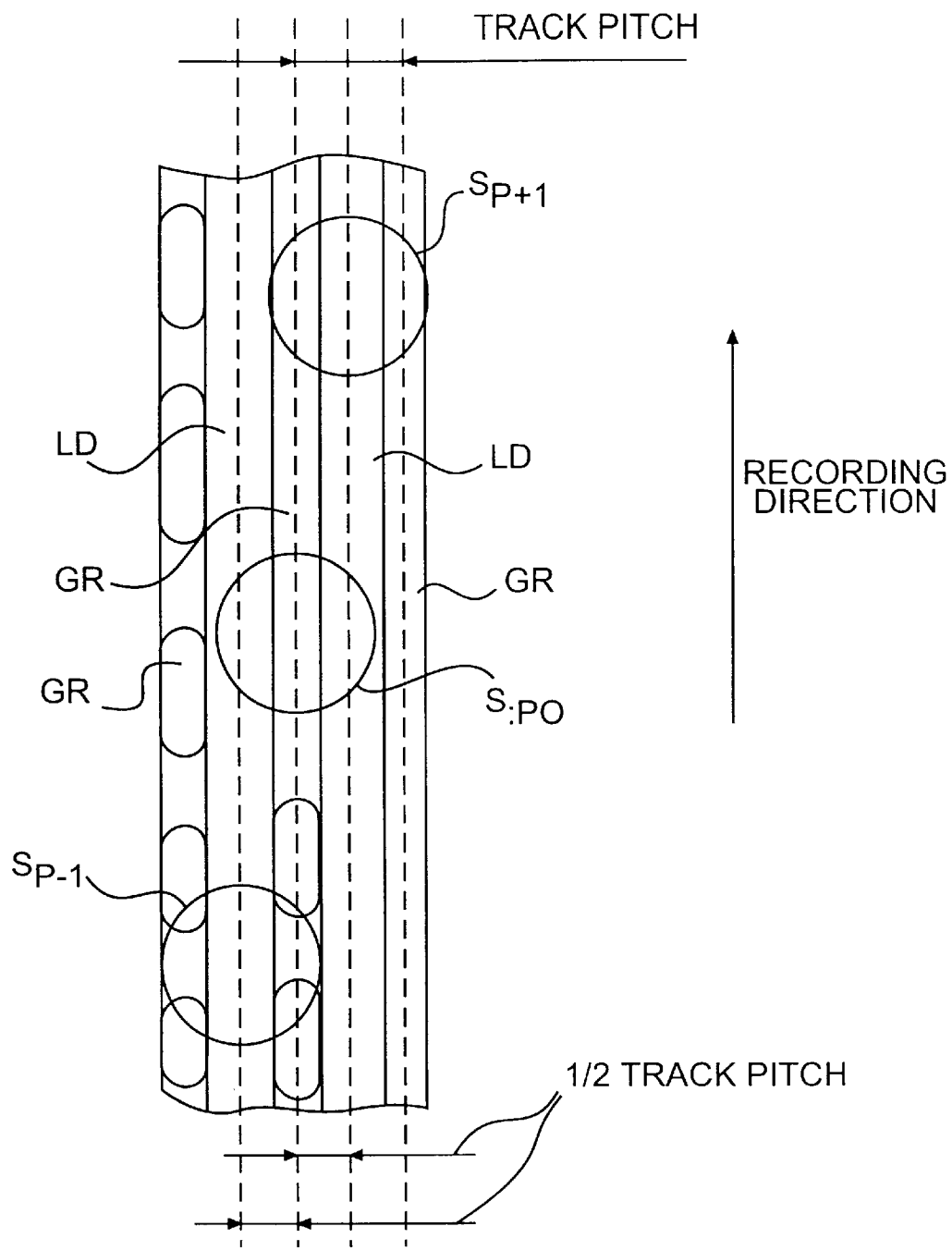
FIG. 3 is a diagram illustrating the positional relation of a recording optical beam to first and second adjusting optical beams, the recording optical beam being emitted from the pickup 2 shown in FIG. 2 onto a DVD-R (recordable) disk 1 shown in FIG. 1.

In this regard and with reference to FIG. 3, the DPP method has been devised to overcome the drawback of the 1-beam push-pull method, i.e., it is vulnerable to dc offsets. In particular, a main beam $S_{p0}$ is used to read and write information. The photodetector is divided into two segments by a line segment optically parallel to a tangential direction of the tracks on the disk. The two segments of the photodetector produce their respective output signals. The difference between these two output signals is called a push-pull signal derived from the main beam $S_{p0}$. Sub-beams $S_{p-1}$ and $S_{p+1}$ hit positions spaced from the position on the track hit by the main beam by ½ track pitch. For example, if the track is a grooved track GR, the sub-beams shine on land tracks LD. At least one sub-beam produces a push-pull signal. The difference between these two push-pull signals is used as a tracking error signal. That is, the main beam $S_{p0}$ and the sub-beams $S_{p-1}$ and $S_{p+1}$ are caused to simultaneously hit positions spaced from each other by half of the track pitch as described above and shown in FIG. 3. These beams give rise to reflected optical beams, which in turn produce push-pull signals. The difference between these two push-pull signals is taken as a tracking error signal.

With respect to the push-pull signals derived from the main beam $S_{p0}$ and the sub-beams $S_{p-1}$ and $S_{p+1}$, respectively, dc components produced by eccentricity of the disk appear on the push-pull signals as components that are in phase with each other. The tracking error components appear as 180° out-of-phase components. Therefore, by taking the difference between the two push-pull signals, the dc components, i.e., the dc offsets, are canceled out. Hence, only the tracking error component is derived.

Since the present invention exploits the DPP method described above, the diffraction grating 23 is inserted in the pickup 2 to produce zero-order beam and ±1st order beams as shown in FIG. 2. The diffraction grating 23 is rotated such that the zero-order beam and ±1st order beams assume a positional relationship on the DVD-R disk 1 as shown in FIG. 3. That is, when the zero-order beam ($S_{p0}$) hits the grooved track GR, the ±1st order beams ($S_{p+1}, S_{p-1}$) that are sub-beams shine on adjacent lands LD. In this embodiment, the zero-order beam ($S_{p0}$) precedes the −1st order light $S_{p-1}$ in the direction in which information is recorded. The +1st order light $S_{p+1}$ is a sub-beam preceding the main beam in the recording direction. In the present invention, the ±1st order beams which would otherwise be used for tracking error detection are used for running OPC (optimum power control) of the laser beams by a method described below.

Figure 4:
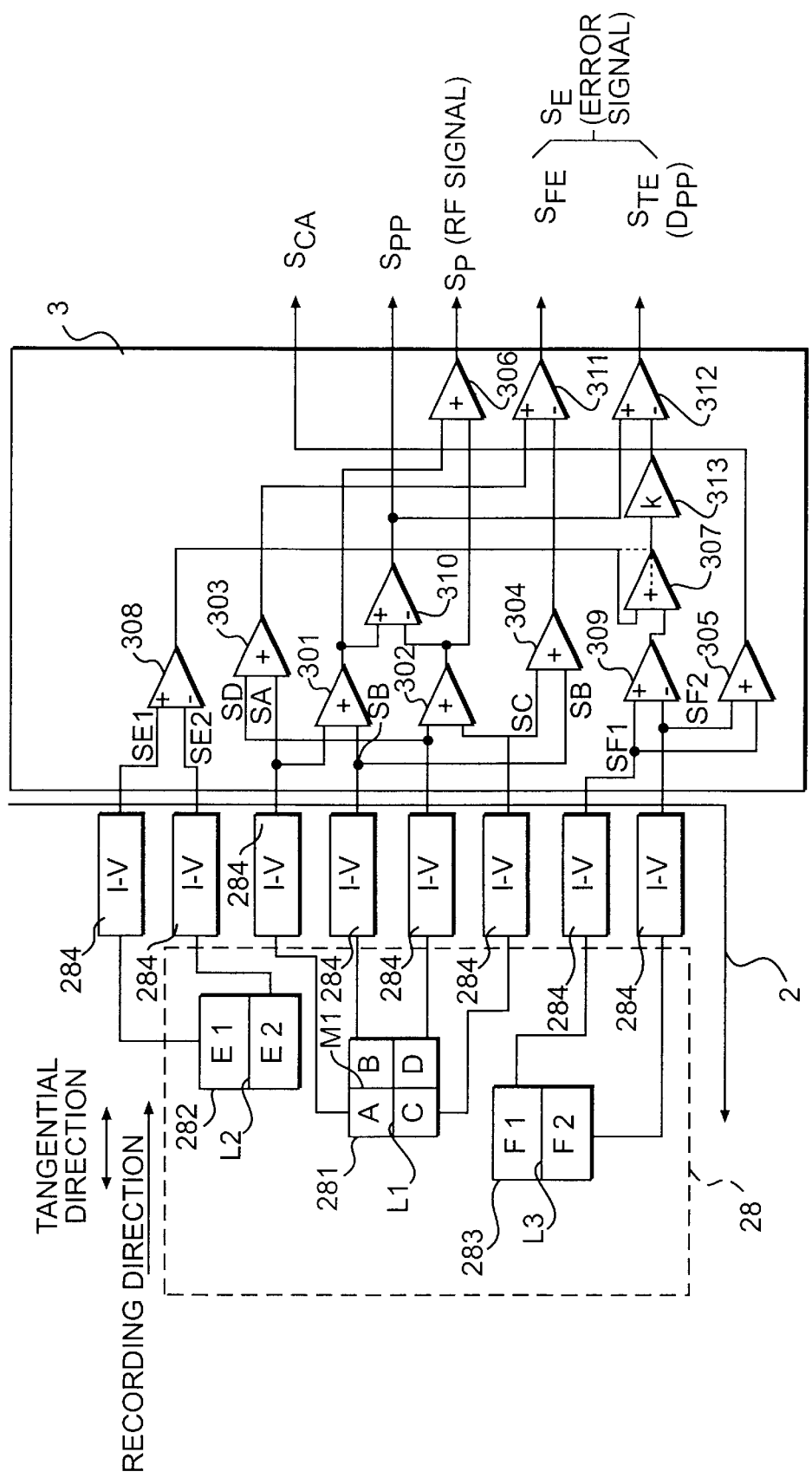
FIG. 4 is a block diagram of a recording optical beam power control device in accordance with a first embodiment of the present invention.
Figure 5:
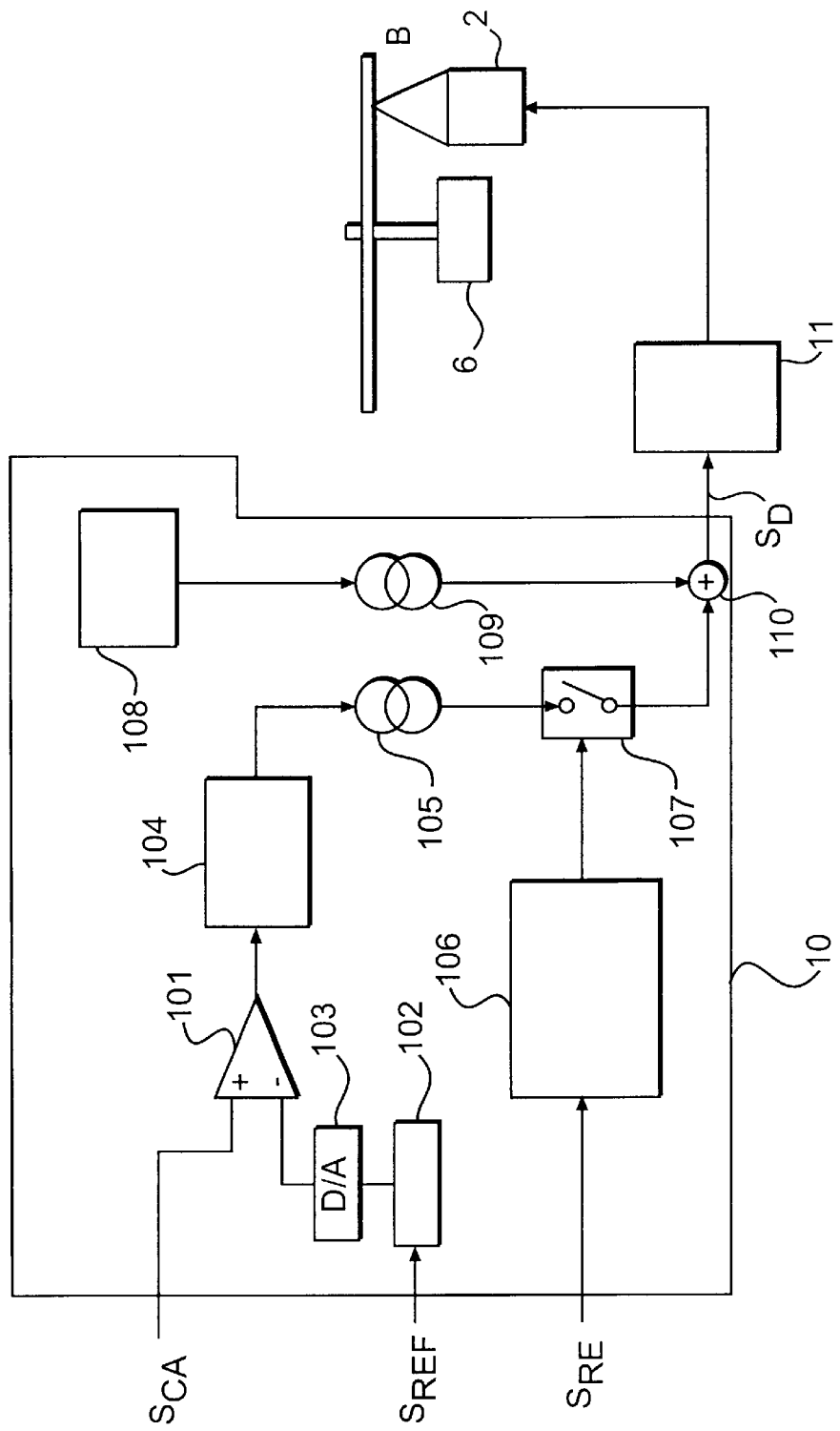
FIG. 5 is a circuit diagram of a specific example of the power control circuit included in the optical recording optical beam power control device shown in FIG. 4.

A first embodiment of the recording power control device RS is described by referring to FIGS. 4 and 5, in which the control device RS is used to control the recording power of an optical beam. FIG. 4 specifically shows the structures of the photodetector 28 and the operational amplifier 3 in the pickup 2 of the control device RS. FIG. 5 specifically shows the structure of the power control circuit 10 of the control device RS.

In FIG. 4, photodetectors 281, 282, and 283 are disposed corresponding to the three optical beams, i.e., the zero-order beam and ±1st order beams, used in the DPP method described previously. The photodetector 281 receives the zero-order light (i.e., the main beam for recording) reflected from the DVD-R disk 1. The photodetector 281 is divided into four segments A, B, C, and D (hereinafter A–D) by a line segment L1 optically parallel to a tangential direction of the tracks on the disk 1 and a line segment M1 perpendicular or vertical to the line segment L1.

The photodetector 282 receives the +1st order light (i.e., the sub-beam preceding the main beam in the recording direction) reflected off the DVD-R disk 1 and is divided into two segments E1 and E2 by the aforementioned line segment L1 and the line segment L2 parallel to it.

The photodetector 283 receives the sub-beam (hereinafter referred to as the following sub-beam) that is reflected off the disk 1 and behind the main beam in the recording direction. The photodetector 283 is divided into two segments F1 and F2 by the line segment L1 and a line segment L3 parallel to it.

The output current signals from the segments A–D, E1, E2, F1, and F2 of the photodetectors 281–283 are converted into voltages by their respective I/V converters 284. The output signals $S_{DT}$ from these I/V converters 284 are delivered to the operational amplifier 3.

The operational amplifier 3 consists of adders 301–307, subtractors 308–312, and a multiplier 313. These arithmetic components are constructed as shown in FIG. 4 to perform desired calculations.

First, the adder 303 calculates the sum of the output signal SA from the segment A of the photodetector 281 and the output signal SD from the segment D. Similarly, the adder 304 calculates the sum of the output signals SB and SC from the segments B and C, respectively. The subtractor 311 produces the difference between the output signal from the adder 303 and the output signal from the adder 304. That is, a focus error signal $S_{FE}$ for the main beam $S_{p0}$ is calculated, based on an astigmatic aberration method that is a well-known technique. This focus error signal $S_{FE}$ is supplied as one error signal $S_E$ to the servo circuit 7. Servo control is provided to maintain the main beam $S_{p0}$ in focus at all times on the DVD-R disk 1. That is, the servo focus signal $S_{FE}$ becomes zero.

The adders 301, 302, and 306 produce the total of the output signals from the segments A–D of the photodetector 281, i.e., the RF signal Sp containing information represented by a string of pits recorded in the track illuminated with the main beam. The RF signal $S_p$ is sent to the decoder 4.

The adder 301 calculates the sum of the output signals SA and SB from the segments A and B, respectively, of the photodetector 281. The adder 302 computes the sum of the output signal SC and SD from the segments C and D, respectively. The subtractor 310 calculates the difference between the output signals from these adders 301 and 302. That is, a push-pull signal about the main beam $S_{p0}$ is calculated. This push-pull signal is supplied as a prepit detection signal $S_{pp}$ to the prepit signal decoder 5 and to the subtractor 312.

The aforementioned push-pull signal can be used as the prepit detection signal $S_{pp}$, because the prepits on the DVD-R disk 1 used in the present embodiment are formed on the guide track (land track in this example) acting to guide the main beam $S_{p0}$ to the track containing information. The guide track is adjacent to the recording track containing information (grooved track in this example). The form of this DVD-R disk 1 is described in detail, for example, in Japanese Patent Laid-Open No. 171528/1996 and corresponding European Patent Application published Oct. 8, 1997 under Publication No. EP 0800165A1, which are herein incorporated by reference.

The adder 307, the subtractors 308, 309, 312 and the multiplier 313 arithmetically finds the tracking error signal $S_{TE}$ based on the DPP method described above. In particular, the subtractor 308 produces the difference (push-pull signal) between the output signal SE1 from the segment E1 of the photodetector 282 and the output signal SE2 from the segment E2. The subtractor 309 produces the difference (push-pull signal) between the output signal SF1 from the segment F1 of the photodetector 283 and the output signal SF2 from the segment F2. The adder 307 produces the sum of the output signals from these subtractors 308 and 309. The multiplier 313 multiplies the output from the adder 307 by a given coefficient k. The subtractor 312 produces the difference between the output signal from the multiplier 313 (i.e., the multiplied sum of the push-pull signals corresponding to the sub-beams $S_{p+1}$ and the following sub-beam $S_{p-1}$ corresponding to the preceding sub-beam $S_{p+1}$ and the following sub-beam $S_{p-1}$, respectively,) and the output signal $S_{pp}$ from the subtractor 310 that is the push-pull signal corresponding to the main beam $S_{p0}$. The tracking signal $S_{TE}$ found arithmetically in this way is produced as one error signal $S_E$ to the servo circuit 7. Servo control is provided such that the main beam $S_{p0}$ scans the surface of the track of the DVD-R disk 1 that contains information. That is, the tracking error signal $S_{TE}$ is brought to zero.

The aforementioned coefficient k is set according to the ratio of the spectrometric division ratio of the sub-beams $S_{p+1}$, $S_{p-1}$ to the main beam $S_{p0}$ provided by the diffraction grating 23 in the pickup 2. The coefficient is set to a value at which the dc components of the output signal from the subtractor 312 are canceled out and thus do not appear.

The adder 305 produces the sum of the output signals from the segments F1 and F2 of the photodetector 283, i.e., the sum signal derived from the following sub-beam $S_{p-1}$, is supplied as an adjusting signal $S_{CA}$ for the recording power to the power control circuit 10.

When the main beam $S_{p0}$ is recording information on the grooved track being scanned, the following sub-beam $S_{p-1}$ shines on the land track located on opposite sides of prerecorded grooved tracks as shown in FIG. 3. Therefore, the adjusting signal $S_{CA}$ produced from the adder 305 contains information indicating the reflectivity of the disk varied by the recording operation immediately after information is recorded on the grooved track.

The power control circuit 10 is next described by referring to FIG. 5. This power control circuit 10 comprises a subtractor 101, a register 102 for temporarily holding the reference signal $S_{REF}$ supplied from the processor 8, a digital-to-analog converter 103, and a power-setting circuit 104 for setting a driving power to be added when the laser diode writes according to the output signal from the subtractor 101. Further, the power control circuit comprises a current source 105 for supplying an electric current corresponding to the electric power set by the power-setting circuit 104, and a waveshape converter circuit 106 for shaping the pit shape formed on the DVD-R disk 1 in relation to the encoded signal $S_{RE}$, i.e., so-called light strategy processing. Still further, the power control circuit comprises a switch 107 for relaying the current supplied from the current source 105 according to the output signal from the waveform converter circuit 106, a power-setting circuit 108 for setting the driving power during reproduction, a current source 109 for supplying a current corresponding to the electric power set by the power-setting circuit 108, and an adder 110 for summing up the current supplied from the current source 105 via the switch 107 and the current supplied from the current source 109. The adder or power control circuit supplies the sum signal as a drive signal $S_D$ to the laser drive circuit 11.

That is, the power control circuit 10 adds the current supplied from the current source 105 according to the encoded signal $S_{RE}$ containing information to be recorded to the driving current supplied from the current source 109 during reproduction. In this way, a driving current used during recording is created. The value of the added current produced from the current source 105 is adjusted according to the difference between the adjusting signal $S_{CA}$ and the reference signal $S_{REF}$.

The processor 8 previously gains the reference signal $S_{REF}$ by the OPC (optimum power control) processing in the PCA (power calibration area) of the DVD-R disk 1 before recording of information and stores the signal in the register 102. That is, when a region of the PCA tentatively recorded is played back with a recording power that makes best the quality of the reproduced signal, the obtained sum signal (the output from the adder 305) derived from the following sub-beam $S_{p-1}$ is stored as the reference signal $S_{REF}$ in the register 102.

Accordingly, the subtractor 101 produces the difference between the adjusting signal $S_{CA}$ representing the reflectivity of the track immediately after information is recorded by illumination of the main beam and the reference signal $S_{REF}$. The power-setting circuit 104 is set to an electric power that brings this difference down to zero. That is, negative feedback is provided to bring the adjusting signal $S_{CA}$ into agreement with the reference signal $S_{REF}$. Therefore, information can be recorded with optimum power if the recording conditions on the disk vary according to the recording position.

The first embodiment described above adopts a three-beam DPP method. That is, the sum of the push-pull error signal derived from the preceding sub-beam $S_{p+1}$ relative to the main beam $S_{p0}$ and the push-pull error signal derived from the following sub-beam $S_{p-1}$ is produced. The difference between the push-pull error signal derived from the main beam $S_{p0}$ and the above-described sum signal is calculated. The resulting difference signal is used as a tracking error signal.

The present invention is also applicable to a two-beam DPP method. In particular, the adder circuits 301, 302 and the subtractor circuit 310 produce a push-pull error signal regarding the main beam $S_{p0}$. The subtractor circuit 309 and the multiplier 313 create the push-pull error signal about the following sub-beam $S_{p-1}$ relative to the main beam. The subtractor circuit 312 produces the difference between these two push-pull error signals as a tracking error signal. In this case, the subtractor circuit 308 and the adder circuit 307 associated with the calculation of the preceding sub-beam $S_{p+1}$ can be dispensed with.

Figure 6:
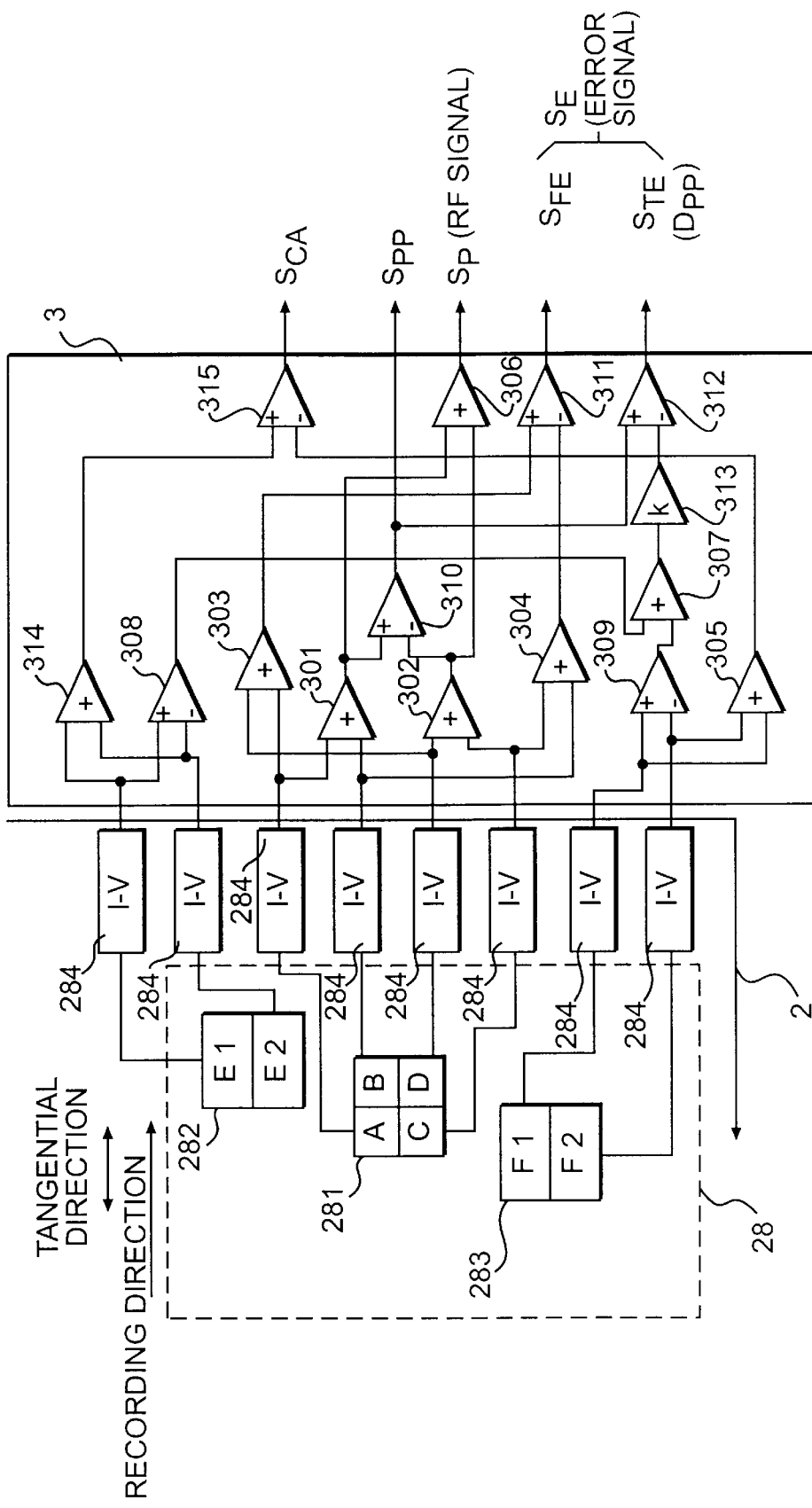
FIG. 6 is a block diagram of an optical recording optical beam power control device in accordance with a second embodiment of the present invention.

With reference to FIG. 6, another embodiment of the optical beam recording power control device of the present invention is described. Note that like components are indicated by like reference numerals in various figures and that those components which have been already described will not described below.

Components added to the structure shown in FIG. 6 are an adder 314 and a subtractor 315. The adder 314 produces the sum of the output signal SE1 from the segment E1 and the output signal SE2 from the segment E2, i.e., the total signal derived from the preceding sub-beam $S_{p+1}$. The subtractor 315 produces the difference between the sum signal derived from the preceding sub-beam $S_{p+1}$ and the sum signal regarding the following sub-beam $S_{p-1}$ produced from the adder 305. The output from the subtractor 315 is supplied as the adjusting signal $S_{CA}$ to the power control circuit 10.

When the main beam $S_{p0}$ is recording information on the grooved track being scanned, the preceding sub-beam $S_{p+1}$ illuminates the land track located on opposite sides of prerecorded grooved tracks as shown in FIG. 3. The following sub-beam $S_{p-1}$ illuminates the land track located on opposite sides of prerecorded grooved tracks.

In this embodiment, the adjusting signal $S_{CA}$ represents the difference in reflectivity between unrecorded and recorded regions. At this time, the amount of crosstalk of the information recorded by the main beam $S_{p0}$ into the preceding sub-beam $S_{p+1}$ and the amount of crosstalk of the same information into the following sub-beam $S_{p-1}$ can be regarded as substantially equal. That is, the preceding sub-beam $S_{p+1}$ and the following sub-beam $S_{p-1}$ are located substantially on the same circumference about the main beam $S_{p0}$ and so the effects of these two crosstalk components can be regarded as the same. Consequently, the subtraction by the subtractor 315 causes the crosstalk components into the preceding sub-beam $S_{p+1}$ and the following sub-beam $S_{p-1}$ to cancel out. The adjusting signal $S_{CA}$ represents only the difference in reflectivity between the unrecorded and recorded regions with desirable results.

In this embodiment, the reference signal $S_{REF}$ is stored together with the adjusting signal $S_{CA}$ derived from the subtractor 315 when testing recording is made in optimum power control in the PCA of the DVD-R disk 1 prior to recording of information. During the testing recording, the recording power is varied. The testing recording is reproduced. A set value of the recording power that makes best the quality of the reproduced signal is selected. At this time, the adjusting signal $S_{CA}$ recorded corresponding to the selected recording power is held as the reference signal $S_{REF}$ in the register 102.

Figure 7:
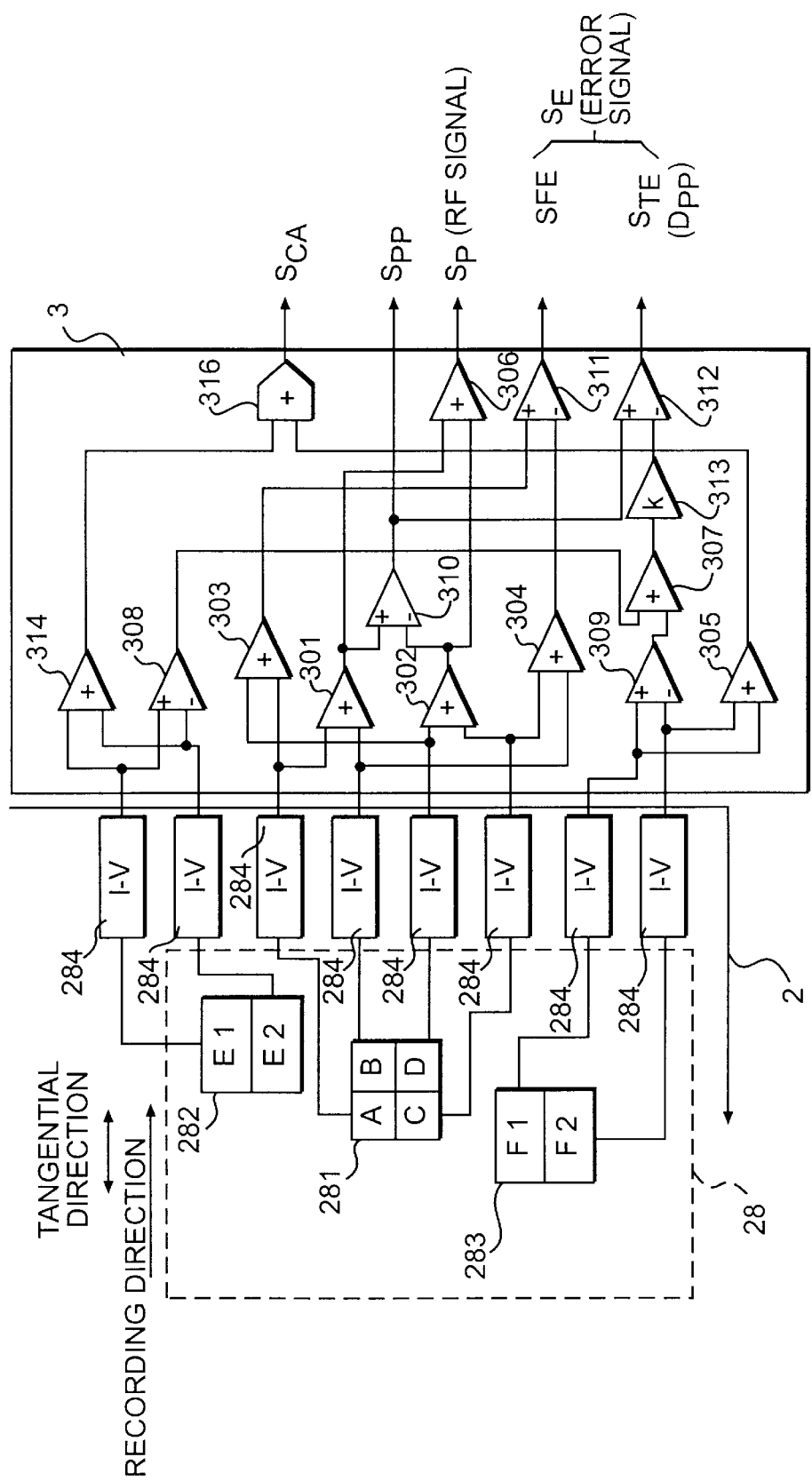
FIG. 7 is a block diagram of an optical recording optical beam power control device in accordance with a third embodiment of the present invention.

With reference to FIG. 7, another embodiment of the optical beam recording power control device is disclosed. Once again, like components are denoted by like reference numerals in various figures. The structure shown in FIG. 7 is similar to the structure shown in FIG. 6 except that a divider 316 is provided instead of the subtractor 315.

In this embodiment, the adjusting signal $S_{CA}$ represents the ratio of the reflectivity of the unrecorded region obtained from the preceding sub-beam $S_{p+1}$ to the reflectivity of the recorded region obtained from the following sub-beam $S_{p-1}$. In this configuration, the adjusting signal purely indicates the ratio of the reflectivities irrespective of the amounts of crosstalk components into the preceding sub-beam $S_{p+1}$ and into the following sub-beam $S_{p-1}$. This gives rise to desirable results. That is, if crosstalk components due to the recorded information exist, these crosstalk components are received while affected by the reflectivities of the unrecorded and recorded regions and so their ratio is the ratio of one reflectivity to the other.

Also, in this embodiment, the reference signal $S_{REF}$ is stored together with the adjusting signal $S_{CA}$ derived from the divider 316 when testing recording is made in optimum power control in PCA of the DVD-R disk 1 prior to recording of information. During the testing recording, the recording power is varied. The testing recording is reproduced. A set value of the recording power that makes best the quality of the reproduced signal is selected. At this time, the adjusting signal $S_{CA}$ recorded corresponding to the selected recording power is held as the reference signal $S_{REF}$ in the register 102.

In the description provided above, the DPP method is adopted as a tracking method. Sub-beams used by the DPP method are used also as adjusting optical beams for adjusting the recording power. Dedicated laser diodes for generating adjusting optical beams may also be provided.

Since the present invention is configured as described thus far, the state of recording of information by a preceding recording optical beam is monitored with adjusting optical beams. The result can be reflected in the recording optical beam. The recording power at the recording position on the recording medium can be controlled optimally. Furthermore, the adjusting optical beams can be used also as sub-beams based on the DPP method, the sub-beams being illuminated for tracking control of the recording optical beam. Thus, the invention can be used with existing pickup structures with favorable results.

To summarize, in accordance with one aspect of the invention, the invention provides a control device for controlling the recording power of a recording optical beam emitted by an optical disk drive. The optical disk drive emits the recording optical beam for recording information on an optical recording medium in a recording direction and an adjusting optical beam simultaneously. The adjusting optical beam is behind the recording optical beam. The disk drive includes a light-receiving means for receiving the adjusting optical light reflected off the recording medium. This control device is characterized in that it is equipped with a recording power control means for controlling the recording power of the recording optical beam according to the output signal from the light-receiving means, the recording optical beam preceding the adjusting optical beam in the recording direction.

With this control device, the adjusting optical beam is emitted simultaneously with the recording optical beam but behind the recording optical beam in the recording direction on the optical recording medium. That is, the adjusting optical beam is at a position previously recorded by the recording optical beam. The light-receiving means receives the adjusting optical beam reflected off the optical recording medium. The power control means controls the power of the recording optical beam according to the output from the light-receiving means.

Accordingly, the adjusting optical beam monitors the manner in which information is recorded by the preceding optical recording optical beam. The result can be reflected in the recording optical beam. Therefore, the recording power can be controlled to a value best suited for the recording position on the recording medium.

In accordance with another aspect of the present invention, a control device is provided which controls the power of a recording optical beam and comprises a first light-receiving means, a second light-receiving means, a first arithmetic means, a second arithmetic means, and a third arithmetic means. A recording optical light is directed to the recording surface of an optical recording medium and reflected. The first light-receiving means receives the reflected recording optical beam and divides the reflected beam into segments by a line segment optically parallel to the tangential direction of tracks on the medium. An adjusting optical beam is directed to the tracks behind the recording optical beam in the recording direction. The adjusting optical beam is emitted so as to be spaced from the recording optical beam by about half of the track pitch in a direction perpendicular or vertical to the tangential direction of the tracks. The second light-receiving means receives at least the adjusting optical beam reflected off the recording medium and divides the reflected beam into segments by a line segment optically parallel to the tangential direction of the tracks. The first arithmetic means calculates the difference between the outputs from all the segments of the first light-receiving means. The second arithmetic means calculates the difference between the outputs from all the segments of the second light-receiving means. The third arithmetic means calculates the difference between the output signal from the first arithmetic means and the output signal from the second arithmetic means. The control device further includes a tracking control means that provides tracking control of the recording optical beam, using the output signal from the third arithmetic means as a tracking error signal. The control device further includes a recording power control means for controlling the recording power of the preceding recording optical beam and a fourth arithmetic means for calculating the total of the outputs from the segments of the second light-receiving means. The recording power control means controls the recording power of the recording optical beam according to the output signal from the fourth arithmetic means.

With this control device, the adjusting optical beam is emitted behind the recording optical beam in the direction in which information is recorded. The adjusting optical beam is emitted so as to be spaced from the recording optical beam by about half of the track pitch (track spacing) of the tracks in a direction perpendicular or vertical to the recording direction. The second light-receiving means receives the recording optical beam reflected off the recording medium and divides the reflected beam into segments by a line segment optically parallel to the tangential direction of the tracks. The first arithmetic means produces the difference between the outputs from the segments of the second light-receiving means, i.e., creates a push-pull error signal for the recording optical beam. The second arithmetic means creates a push-pull error signal for the adjusting optical beam. The third arithmetic means calculates the difference between the push-pull error signal created by the first arithmetic means and the push-pull error signal created by the second arithmetic means, thus creating a tracking error signal. That is, the first through third arithmetic means produce a tracking error signal by a so-called differential push-pull (DPP) method. The tracking control means provides tracking control of the recording optical beam according to the tracking error signal. The fourth arithmetic means creates a total signal indicating the total of the adjusting optical beam reflected from the optical recording medium located between tracks already recorded with information by the recording optical beam. That is, the fourth arithmetic means produces a signal corresponding to the amount of light reflected from the prerecorded region. The power control means controls the recording power of the recording optical beam according to the total signal.

The manner in which information is recorded by the preceding recording optical beam is monitored by the adjusting optical beam. The result can be reflected in the recording optical beam. Therefore, the recording power can be controlled optimally for the recording position on the recording medium. Furthermore, the adjusting optical beam can act also as a sub-beam emitted for tracking control of the recording optical beam. The sub-beam is based on the DPP method. Consequently, the invention can be applied to existing pickup structures.

In accordance with another aspect of the invention, the control device is further characterized in that the recording power control means further includes a comparison means for comparing the output signal from the fourth arithmetic means with a given reference value. The recording power is controlled to bring the output from the comparison means down to zero.

With this control device, the recording power control means controls the recording power to bring the output signal from the fourth arithmetic means into agreement with the given reference value. Accordingly, if the given reference value is set to a value corresponding to the amount of reflection when recording is made with a recording power that minimizes the jitter in the reproduced signal previously captured in the PCA (power calibration area), for example, negative feedback is provided such that the recording power is made optimal irrespective of the recording position on the recording medium.

In accordance with another aspect of the invention, a control device comprises: a first light-receiving means divided into segments by a line segment optically parallel to the tangential direction of the tracks on an optical recording medium and acting to receive recording light reflected off the recording medium, the recording light being directed to the recording surface of the recording medium; a second light-receiving means divided into segments by a line segment optically parallel to the tangential direction of the tracks and acting to receive a first adjusting optical beam reflected off the recording medium, the first adjusting optical beam being emitted ahead of the illumination position of the recording optical beam and spaced from the recording optical beam by about an odd multiple of half of the track pitch in a direction perpendicular or vertical to the tangential direction of the tracks; a third light-receiving means divided into segments by a line segment optically parallel to the tangential direction of the tracks and acting to receive a second adjusting optical beam reflected off the recording medium, the second adjusting optical beam being emitted behind the illumination position of the recording optical beam and spaced from the recording optical beam by an odd multiple of half of the track pitch; a first arithmetic means for calculating the difference between the outputs from all the segments of the first light-receiving means; a second arithmetic means for calculating the difference between the outputs from all the segments of the second light-receiving means; a third arithmetic means for calculating the difference between the outputs from the segments of the third light-receiving means; a fourth arithmetic means for calculating the sum of the outputs from the second and third arithmetic means; a fifth arithmetic means for calculating the difference between the output from the first arithmetic means and the output from the fourth arithmetic means; and a tracking control means for providing tracking control of the recording optical beam while using the output signal from the fifth arithmetic means as a tracking error signal.

The control device further includes: a recording power control means for controlling the recording power of the recording optical beam; a sixth arithmetic means for calculating the sum of outputs from the segments of the second light-receiving means; a seventh arithmetic means for calculating the sum of the outputs from all the segments of the third light-receiving means; and an eighth arithmetic means for calculating the difference between the output from the sixth arithmetic means and the output from the seventh arithmetic means. The recording power control means controls the recording power of the recording optical beam according to the output signal from the eighth arithmetic means.

With the aforementioned control device, the first light-receiving means receives the recording optical beam reflected from the recording medium. The second light-receiving means receives the first adjusting optical beam emitted so as to be spaced from the recording optical beam by an odd multiple of half of the track pitch forwardly of the illumination position of the recording optical beam in a direction perpendicular or vertical to the direction of tangent to the tracks. The forward direction is defined to be the direction in which information is recorded on the recording medium. In the case of optical disks, information is usually recorded from the inner circumference toward the outer circumference and so the forward direction is from the inner circumference toward the outer circumference. For example, where the recording optical beam is hitting a grooved track on which information is recorded, it follows that the first adjusting optical beam impinges on a land track. The third light-receiving means receives the second adjusting optical beam shone behind the recording optical beam on the tracks in the recording medium. The second adjusting optical beam is emitted so as to be spaced from the recording optical beam by an odd multiple of ½ of the track pitch behind the illumination position (in the negative direction with respect to the illumination position). In the case of optical disks, the negative direction is usually from the outer circumference toward the inner circumference. Each light-receiving means is divided into at least two by a division line or lines optically parallel to the direction of tangent to the tracks. The first arithmetic means creates the push-pull error signal from the recording optical beam. The second arithmetic means creates the push-pull error signal from the first adjusting optical beam. The third arithmetic means creates the push-pull error signal from the second adjusting optical beam. The fourth arithmetic means calculates the sum of the output from the second arithmetic means and the output from the third arithmetic means. The fifth arithmetic means computes the difference between the output from the fourth arithmetic means and the output from the first arithmetic means. A tracking error signal based on the aforementioned DPP method is produced by the fifth arithmetic means. The tracking control means provides tracking control of the recording optical beam according to the tracking error signal described above.

On the other hand, the sixth arithmetic means creates the total signal from the output signals from the segments of the second light-receiving means, the total signal representing the total amount of the first adjusting optical beam reflected off the recording optical medium. The seventh arithmetic means creates a total signal representing the total of the output signals from the segments of the third light-receiving means, i.e., the total amount of the second adjusting optical beam reflected off the recording medium. The eighth arithmetic means calculates the difference between the output from the sixth arithmetic means and the output from the seventh arithmetic means. The power control means controls the recording power of the recording optical beam according to the output from the eighth arithmetic means. When the recording optical beam is recording on a track, the first adjusting optical beam shines on an unrecorded land track on the recording medium. The second adjusting optical beam shines on a prerecorded land track.

Accordingly, the power control means controls the recording power according to the difference between the total amount of light reflected from the unrecorded region on the recording medium and the total amount of light reflected from the recorded region. Where the second and third light-receiving means suffer from crosstalk of recorded information due to recording operation of the recording optical beam, the crosstalk components are canceled out by the differential calculation by the eighth arithmetic means. Consequently, the power can be controlled with improved accuracy. Furthermore, the adjusting optical beam can act also as a sub-beam emitted for tracking control of the recording optical beam, the sub-beam being based on the DPP method. Therefore, the present invention can be applied to existing pickup structures.

In another aspect of the aforementioned control device, the recording power control device of the optical beam is further characterized in that the recording power control means further includes a comparison means for comparing the output signal from the eighth arithmetic means with a given reference value. The recording power is controlled so that the output from the comparison means approaches zero.

This other aspect of the aforementioned control device produces the same advantages as yielded by the control device discussed previously. In addition, the recording power control means controls the recording power to bring the output signal from the eighth arithmetic means into agreement with the given reference value.

Accordingly, if the given reference value is set to a value corresponding to the difference between the amount of light reflected from the unrecorded region and the amount of light reflected from the recorded region where recording is made with a recording power that minimizes the jitter contained in the reproduced signal previously captured in the PCA (power calibration area), negative feedback is provided to optimize the recording power irrespective of the recording position on the recording medium.

In other respect, a recording power control device of the present invention comprises: a first light-receiving means divided into segments by a line segment optically parallel to a tangential direction of tracks on an optical recording medium and acting to receive a recording optical beam reflected off the recording surface of the optical recording medium, the recording optical beam being shone on the recording surface; a second light-receiving means divided into segments by a line segment optically parallel to the tangential direction of the tracks and acting to receive a first adjusting optical beam reflected off the optical recording medium, the first adjusting optical beam being emitted ahead of the illumination position of the recording optical beam so as to be spaced from the recording optical beam by a distance approximately equal to an odd multiple of half of the track pitch in a direction perpendicular or vertical to the direction of tangent of the tracks; a third light-receiving means divided into segments by a line segment optically parallel to the tangential direction of the tracks and acting to receive a second adjusting optical beam reflected from the optical recording medium, the second adjusting optical beam being emitted behind the illumination position of the recording optical beam so as to be spaced from the recording optical beam by about an odd multiple of half of the track pitch in a direction perpendicular or vertical to the direction of tangent to the tracks; a first arithmetic means for calculating the difference between the outputs from all the segments of the first light-receiving means; a second arithmetic means for calculating the difference between the outputs from all the segments of the second light-receiving means; a third arithmetic means for calculating the difference between the outputs from all the segments of the third light-receiving means; a fourth arithmetic means, for calculating the sum of the output from the second arithmetic means and the output from the third arithmetic means; a fifth arithmetic means for calculating the difference between the output from the first arithmetic means and the output from the fourth arithmetic means; and a tracking control means for providing tracking control of the recording optical beam, using the output signal from the fifth arithmetic means as a tracking error signal. The control device further includes a recording power control means for controlling the recording power of the recording optical beam, a sixth arithmetic means for calculating the sum of the outputs from all the segments of the second light-receiving means, a seventh arithmetic means for calculating the sum of the outputs from the segments of the third light-receiving means, and an eighth arithmetic means for calculating the ratio of the output from the sixth arithmetic means to the output from the seventh arithmetic means. A recording power-setting means controls the recording power of the recording optical beam according to the output signal from the eighth arithmetic means.

With this control device, the first light-receiving means receives the recording optical beam reflected from the recording medium. The second light-receiving means receives the first adjusting optical beam shone ahead of the recording optical beam in the direction in which information is recorded. The first adjusting optical beam is shone in the positive direction with respect to the illumination position of the recording optical beam in a direction perpendicular or vertical to the tangential direction of the tracks. The positive direction is defined to be the forward direction in which information is recorded on the recording medium. Usually, information is recorded from the inner circumference toward the outer circumference and so the positive direction is from the inner circumference toward the outer circumference. The first adjusting optical beam is emitted so as to be spaced from the recording optical beam by an odd multiple of half of the track pitch. That is, where the recording optical beam shines on a grooved track, the first adjusting optical beam shines on a land track. The third light-receiving means receives a second adjusting optical beam emitted behind the recording optical beam on the tracks of the recording medium. The second adjusting optical beam is emitted in the negative direction (in the case of an optical disk, usually the direction pointed from the outer circumference toward the inner circumference) with respect to the illumination position of the recording optical beam in a direction perpendicular or vertical to the tangential direction of the tracks so as to be spaced from the recording optical beam by an odd multiple of half of the track pitch.

Each light-receiving means is divided into at least two by a division line or lines optically parallel to a tangential direction of the tracks. The first arithmetic means creates the push-pull error signal from the recording optical beam. The second arithmetic means creates the push-pull error signal from the first adjusting optical beam. The third arithmetic means creates the push-pull error signal from the second adjusting optical beam. The fourth arithmetic means calculates the sum of the output from the second arithmetic means and the output from the third arithmetic means. The fifth arithmetic means computes the difference between the output from the fourth arithmetic means and the output from the first arithmetic means. A tracking error signal based on the aforementioned DPP method is produced by the fifth arithmetic means. The tracking control means provides tracking control of the recording optical beam according to the tracking error signal described above.

The sixth arithmetic means creates the total signal of the second light-receiving means, the total signal representing the total amount of the first adjusting optical beam reflected off the recording medium. The seventh arithmetic means creates a total signal representing the total of the output signals from the third light-receiving means, i.e., the total amount of the second adjusting optical beam reflected off the recording medium. The eighth arithmetic means calculates the ratio of the output from the sixth arithmetic means to the output from the seventh arithmetic means. The power control means controls the recording power of the recording optical beam according to the output from the eighth arithmetic means. When the recording optical beam is recording on a track, the first adjusting optical beam shines on an unrecorded land track on the recording medium. The second adjusting optical beam shines on a land track already recorded.

Accordingly, the power control means controls the recording power according to the ratio of the total amount of light reflected from the unrecorded region on the recording medium to the total amount of light reflected from the recorded region. If the second and third light-receiving means suffer from crosstalk due to recording operation of the recording optical beam, the crosstalk component is simply represented as the ratio of the amount of light reflected from the unrecorded region to the amount of light reflected from the recorded region, i.e., the ratio of the reflectivities of these two kinds of regions, because of the division operation by the eighth arithmetic means. Consequently, the power can be controlled without being affected by the presence or absence of crosstalk component. Furthermore, the adjusting optical beam can act also as a sub-beam emitted for tracking control of the recording optical beam, the sub-beam being based on the DPP method. Therefore, this aspect of the present invention can be applied to existing pickup structures.

In another aspect of the control device, the device is further characterized in that the recording power control means further includes a comparison means for comparing the output signal from the eighth arithmetic means with a given reference value. The recording power is controlled so that the output from the comparison means approaches zero.

This other aspect of the control device achieves the advantages of the preceding control device. In addition, the recording power control means controls the recording power to bring the output signal from the eighth arithmetic means into agreement with the given reference value.

Accordingly, if the given reference value is set to a value corresponding to the ratio of the amount of light reflected from the unrecorded region to the amount of light reflected from the recorded region where recording is made with a recording power that minimizes the jitter contained in the reproduced signal previously captured in the PCA (power calibration area), negative feedback is provided to optimize the recording power irrespective of the recording position on the recording medium.

It will be apparent to those skilled in the art that various modifications and variations can be made in the device of the present invention and in construction of this device without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A recording power control device for use with an optical disk drive for recording information on an optical recording medium in a recording direction with a recording optical beam having a recording power, said optical disk drive emitting an adjusting optical beam simultaneously with the recording optical beam behind the recording optical beam, said optical disk drive having light-receiving means for receiving the adjusting optical beam reflected from the optical recording medium, said recording power control device acting to control the recording power of the recording optical beam, said recording power control device comprising:

recording power control means for controlling the recording power of said recording optical beam preceding the adjusting optical beam in the recording direction according to an output signal from said light-receiving means.

2. A recording power control device for use with an optical disk drive for recording information on a recording surface of an optical recording medium in a recording direction with a recording optical beam having a recording power, said optical recording medium having tracks in its recording surface, said tracks being spaced from each other by one track pitch, said optical disk drive emitting an adjusting optical beam onto the recording surface of said optical recording medium, said optical disk drive having first light-receiving means divided into segments by a line segment optically parallel to a tangential direction of the tracks and acting to receive the reflected recording optical beam, second light-receiving means divided into segments by a line segment optically parallel to a tangential direction of the tracks, said adjusting optical beam impinging on the tracks behind said recording optical beam in the recording direction and spaced from said recording optical beam by about half of the track pitch in a direction perpendicular to the tangential direction of said tracks, said second light receiving means acting to receive at least the adjusting optical beam reflected from all the optical recording medium, first arithmetic means for calculating a difference between output signals from the segments of said first light-receiving means, second arithmetic means for calculating a difference between output signals from all the segments of said second light-receiving means, third arithmetic means for calculating a difference between an output signal from said first arithmetic means and an output signal from said second arithmetic means, and tracking control means for providing tracking control of said recording optical beam using an output signal from said third arithmetic means as a tracking error signal, said recording power control device comprising:

recording power control means for controlling the recording power of said preceding recording optical beam; and fourth arithmetic means for producing an output signal indicating total of output signals from the segments of said second light-receiving means, said recording power control means acting to control the recording power of said recording optical beam according to the output signal from said fourth arithmetic means.

3. The recording power control device according to claim 2, wherein said recording power control means further includes comparison means for comparing the output signal from said fourth arithmetic means with a given reference value, and wherein the recording power is controlled in such a way that an output signal from said comparison means becomes zero.

4. A recording power control device for use with an optical disk drive for recording information on an optical recording medium in a recording direction with a recording optical beam having a recording power, said optical recording medium having tracks in its recording surface, said tracks being spaced from each other by one track pitch, said optical disk drive emitting a first adjusting optical beam ahead of said recording optical beam in the recording direction such that said recording optical beam and said first adjusting optical beam are spaced from each other by about an odd multiple of half of the track pitch in a direction perpendicular to the tracks and such that said first adjusting optical beam is emitted forwardly of an illumination position of said recording optical beam, said optical disk drive emitting a second adjusting optical beam behind said recording optical beam in the recording direction such that said second adjusting optical beam is spaced from said recording optical beam by about an odd multiple of the track pitch in a direction perpendicular to the tracks and such that said second adjusting optical beam is emitted rearwardly of the illumination position of said recording optical beam, said optical disk drive having first light-receiving means divided into segments by a line segment optically parallel to a tangential direction of the tracks and acting to receive the reflected recording optical beam, second light-receiving means divided into segments by a line segment optically parallel to a tangential direction of tracks and acting to receive the first adjusting optical beam reflected from the optical recording medium, third light-receiving means divided into segments by a line segment optically parallel to a tangential direction of the tracks and acting to receive the second adjusting optical beam reflected from said optical recording medium, first arithmetic means for calculating a difference between output signals from the segments of said first light-receiving means, second arithmetic means for calculating a difference between output signals from the segments of said second light-receiving means, third arithmetic means for calculating a difference between output signals from the segments of said third light-receiving means, fourth arithmetic means for calculating a sum of an output from said second arithmetic means and an output from said third arithmetic means, fifth arithmetic means for calculating a difference between an output from said first arithmetic means and an output from said fourth arithmetic means, and tracking control means for providing tracking control of said recording optical beam using an output signal from said fifth arithmetic means as a tracking error signal, said recording power control device comprising:

recording power control means for controlling the recording power of said recording optical beam;

sixth arithmetic means for calculating sum of output signals from the segments of said second light-receiving means;

seventh arithmetic means for calculating a sum of output signals from the segments of said third light-receiving means; and eighth arithmetic means for calculating a difference between an output from said sixth arithmetic means and an output from said seventh arithmetic means, said recording power control means acting to control the recording power of said recording optical beam according to an output signal from said eighth arithmetic means.

5. The recording power control device according to claim 4, wherein said recording power control means further includes comparison means for comparing the output signal from said eighth arithmetic means with a given reference value, and wherein the recording power is controlled in such a way that an output signal from said comparison means becomes zero.

6. A recording power control device for use with an optical disk drive for recording information on an optical recording medium in a recording direction with a recording optical beam having a recording power, said optical recording medium having tracks in its recording surface, said tracks being spaced from each other by one track pitch, said optical disk drive emitting a first adjusting optical beam ahead of said recording optical beam in the recording direction such that said first adjusting optical beam is spaced from said recording optical beam by about an odd multiple of half of the track pitch in a direction perpendicular to the tracks and such that said first adjusting optical beam is emitted forwardly of an illumination position of said recording optical beam, said optical disk drive emitting a second adjusting optical beam behind said recording optical beam in the recording direction such that said second adjusting optical beam is spaced from said recording optical beam by an odd multiple of half of the track pitch in the direction perpendicular to the tracks and such that said second adjusting optical beam is emitted rearwardly of the illumination position of said recording optical beam, said optical disk drive having first light-receiving means divided into segments by a line segment optically parallel to a tangential direction of the tracks and acting to receive the recording optical beam reflected from the recording surface of said optical recording medium, second light-receiving means divided into segments by a line segment optically parallel to a tangential direction of the tracks and acting to receive the first adjusting optical beam reflected from the optical recording medium, third light-receiving means divided into segments by a line segment optically parallel to a tangential direction of the tracks and acting to receive the second adjusting optical beam reflected from said optical recording medium, first arithmetic means for calculating a difference between output signals from the segments of said first light-receiving means, second arithmetic means for calculating a difference between output signals from the segments of said second light-receiving means, third arithmetic means for calculating a difference between output signals from the segments of said third light-receiving means, fourth arithmetic means for calculating a sum of an output from said second arithmetic means and an output from said third arithmetic means, fifth arithmetic means for calculating a difference between an output from said first arithmetic means and an output from said fourth arithmetic means, and a tracking control means for providing tracking control of said recording optical beam using an output signal from said fifth arithmetic means as tracking error signal, said recording power control device comprising:

recording power control means for controlling the recording power of said recording optical beam;

sixth arithmetic means for calculating a sum of output signals of the segments of said second light-receiving means;

seventh arithmetic means for calculating a sum of output signals from the segments of said third light-receiving means; and eighth arithmetic means for calculating the ratio of an output from said sixth arithmetic means to an output from said seventh arithmetic means, said recording power control means acting to control the recording power of said recording optical beam according to an output signal from said eighth arithmetic means.

7. The recording power control device of claim 6, wherein said recording power control means further includes comparison means for comparing the output signal from said eighth arithmetic means with a given reference value, and wherein the recording power is controlled in such a way that an output signal from said comparison means becomes zero.

8. A method for controlling an optical beam, which records digital information onto an optical recording medium in a recording direction, comprising:

(a) emitting a recording optical beam having a recording power onto an optical recording medium;

(b) simultaneously with (a), emitting an adjusting optical beam behind the recording optical beam relative to the recording direction;

(c) receiving the adjusting optical beam reflected from the optical recording medium;

(d) producing an output signal based on the received reflected adjusting optical beam; and (e) adjusting the recording power of the recording optical beam according to the output signal.

9. The method according to claim 8 wherein the optical recording medium has tracks in its recording surface, said tracks being spaced from each other by one track pitch, the method further comprising:

(f) emitting the adjusting optical beam spaced from the recording optical beam by about half of a track pitch in a direction perpendicular to the tangential direction of the tracks;

(g) receiving the reflected recording optical beam in segments defined by a line segment optically parallel to a tangential direction of said adjusting optical beam;

(h) receiving the reflected adjusting optical beam in segments defined by a line segment optically parallel to a tangential direction of the tracks;

(i) calculating a first difference between output signals from the segments in (g), which receive the reflected adjusting optical beam, and generating an output signal therefrom;

(j) calculating a second difference between output signals from the segments in (h), which receive the reflected recording optical beam, and generating an output signal therefrom;

(k) calculating a third difference between the output signals of (i) and (j) and generating a tracking error signal therefrom;

(l) adjusting tracking of the recording optical beam based on the tracking error signal;

(m) producing an output signal indicating a total of output signals from the segments of (h); and (n) adjusting the recording power of the recording optical beam according to the output signal of (m).

10. The method according to claim 9 further comprising:
(o) comparing the output signal from (m) with a given reference value and generating an output signal therefrom; and
(p) adjusting the recording power of the recording optical beam such that the output signal from (o) becomes zero.

11. A method for controlling a recording optical beam, which records digital information onto an optical recording medium in a recording direction, the optical recording medium having tracks in its recording surface, the tracks being spaced from each other by one track pitch, the method comprising:
(a) emitting a first adjusting optical beam ahead of the recording optical beam in the recording direction such that said recording optical beam and said first adjusting optical beam are spaced from each other by about an odd multiple of half of the track pitch in a direction perpendicular to the tracks and such that said first adjusting optical beam is emitted forwardly of an illumination position of said recording optical beam;
(b) emitting a second adjusting optical beam behind said recording optical beam in the recording direction such that said second adjusting optical beam is spaced from said recording optical beam by about an odd multiple of the track pitch in a direction perpendicular to the tracks and such that said second adjusting optical beam is emitted rearwardly of the illumination position of said recording optical beam,
(c) receiving in segments the recording optical beam reflected from the recording optical medium, the segments being defined by a line segment optically parallel to a tangential direction of the tracks, and generating output signals from each segment;
(d) receiving in segments the first adjusting optical beam reflected from the optical recording media, the segments being defined by a line segment optically parallel to a tangential direction of the said tracks, and generating output signals from each segment;
(e) receiving in segments the second adjusting optical beam reflected from the optical recording medium, the segments defined by a line segment optically parallel to a tangential direction of the tracks and generating output signals from each segment;
(f) calculating a difference between output signals from the segments of (c) and generating an output signal therefrom;
(g) calculating a difference between output signals from the segments of (d) and generating an output signal therefrom;
(h) calculating a difference between output signals from the segments of (e) and generating an output signal therefrom;
(i) calculating a sum of the output signals from (g) and (h) and generating an output signal therefrom;
(j) calculating a difference between the output signals from (f) and (i) and generating a tracking error signal therefrom;
(k) adjusting tracking of the recording optical beam using the tracking error signal
(l) adjusting the recording power of the recording optical beam by:
(i) calculating a sum of output signals from the segments of (d) and generating an output signal therefrom;
(ii) calculating a sum of output signals from the segments of (e) and generating an output signal therefrom;
(iii) calculating a quantity based on the output signals from (l)(i) and (l)(ii) and generating an output signal therefrom;
(iv) controlling the recording power of said recording optical beam according to the output signal from (l)(iii).

12. The method according to claim 11 wherein the quantity of step (l)(iii) is a difference.

13. The method according to claim 12 further including:
(m) comparing the output signal from (l)(iii) with a given reference value;
(n) adjusting the recording power in such a way that the output signal from (m) becomes zero.

14. The method according to claim 11 wherein the quantity of step (l)(iii) is a ratio.

15. The method according to claim 14 further including:
(m) comparing the output signal from (l)(iii) with a given reference value;
(n) adjusting the recording power in such a way that the output signal from (m) becomes zero.

* * * * *